United States Patent
Rohwer

(10) Patent No.: US 9,167,834 B2
(45) Date of Patent: Oct. 27, 2015

(54) PREPARING OIL SEED FOR RUMINANT FEED

(76) Inventor: Gary L. Rohwer, Parma, ID (US)

(*) Notice: Subject to any disclaimer, the term of this patent is extended or adjusted under 35 U.S.C. 154(b) by 1730 days.

(21) Appl. No.: 11/701,538

(22) Filed: Jan. 31, 2007

(65) Prior Publication Data

US 2007/0292572 A1    Dec. 20, 2007

Related U.S. Application Data

(60) Provisional application No. 60/764,185, filed on Jan. 31, 2006.

(51) Int. Cl.
*A23K 1/00* (2006.01)
*A23K 1/18* (2006.01)
*A23K 1/14* (2006.01)

(52) U.S. Cl.
CPC ............... *A23K 1/1813* (2013.01); *A23K 1/003* (2013.01); *A23K 1/14* (2013.01)

(58) Field of Classification Search
CPC ......... A23K 1/00; A23K 1/001; A23K 1/003; A23K 1/14; A23K 1/18; A23K 1/1813
USPC ........... 426/54, 288, 630, 287, 531, 615, 629; 436/630
See application file for complete search history.

(56) References Cited

U.S. PATENT DOCUMENTS

| | | |
|---|---|---|
| 695,476 A | 3/1902 | McFarlane |
| 3,264,113 A | 8/1966 | Barta et al. |
| 3,966,998 A | 6/1976 | Rawlings et al. |
| 4,042,718 A | 8/1977 | Rawlings et al. |
| 4,073,960 A | 2/1978 | Scott et al. |
| 4,138,505 A | 2/1979 | Hart et al. |
| 4,208,433 A | 6/1980 | Barham, Jr. et al. |
| 4,216,234 A | 8/1980 | Rawlings et al. |
| 4,217,370 A | 8/1980 | Rawlings et al. |
| 4,248,899 A | 2/1981 | Lyon et al. |
| 4,369,195 A * | 1/1983 | Nelson et al. ........... 426/62 |
| 4,543,264 A | 9/1985 | Stahel |
| 4,642,317 A | 2/1987 | Palmquist et al. |
| 4,664,905 A | 5/1987 | Meyer |
| 4,704,287 A | 11/1987 | Meyer |

(Continued)

OTHER PUBLICATIONS

Mir, Z., et al., Methods of protecting Soybean and canola proteins from degradation in the rumen. J.Anim. Sci. 64(1984) 853-865.*

(Continued)

*Primary Examiner* — D Lawrence Tarazano
*Assistant Examiner* — Jerry W Anderson

(57) ABSTRACT

Compositions of ruminant feed and feed components are disclosed, as well as methods for preparing oil seeds for ruminant feed. Oil seeds may be subjected to heat and an aqueous alkaline solution until the seed coat is broken, exhibiting splits, cracks, wrinkles, and deformations. Preferably, the heat is applied until the mix of seeds and alkaline solution reach between about 160-220° F. Preferably, the heat and alkaline solution treatment is maintained for between 20 and 100 minutes, in order to thoroughly "cook" the seeds, as exhibited by swelling, splitting, cracking, wrinkling and/or deforming of the seed coat. Then, the hot, wet, treated seeds may be subjected to, for example, a screw extruder or other process for mashing, macerating, or otherwise forming the treated seeds into a damp noodle or other pasty, mashed, and/or mealy material.

8 Claims, 4 Drawing Sheets

(56) References Cited

U.S. PATENT DOCUMENTS

| | | |
|---|---|---|
| 4,808,429 A | 2/1989 | Freeman |
| 4,824,679 A | 4/1989 | Freeman |
| 4,983,403 A | 1/1991 | Ardaillon et al. |
| 5,143,737 A | 9/1992 | Richardson |
| 5,225,230 A | 7/1993 | Seaman et al. |
| 5,514,388 A | 5/1996 | Rohwer |
| 5,540,932 A | 7/1996 | Lanter et al. |
| 5,585,134 A | 12/1996 | Cummings et al. |
| 5,662,958 A * | 9/1997 | Kennelly et al. ............... 426/630 |
| 5,670,191 A | 9/1997 | Cummings et al. |
| 5,683,739 A | 11/1997 | Lanter et al. |
| 5,705,206 A | 1/1998 | Ashes et al. |
| 5,714,185 A | 2/1998 | Mahadevan |
| 5,789,001 A | 8/1998 | Klopfenstein et al. |
| 5,849,348 A | 12/1998 | Vinci et al. |
| 5,874,102 A | 2/1999 | LaJoie et al. |
| 5,885,610 A | 3/1999 | Anderson |
| 5,928,687 A | 7/1999 | Meade et al. |
| 5,955,122 A | 9/1999 | Petersen |
| 6,214,371 B1 | 4/2001 | Kobayashi et al. |
| 6,229,031 B1 | 5/2001 | Strohmaier et al. |
| 6,242,013 B1 | 6/2001 | Luhman et al. |
| 6,288,114 B1 | 9/2001 | Bauman et al. |
| 6,322,827 B1 | 11/2001 | Scott et al. |
| 6,392,075 B1 | 5/2002 | Strohmaier et al. |
| 6,410,070 B2 | 6/2002 | Dahlen et al. |
| 6,506,423 B2 | 1/2003 | Drouillard et al. |
| 6,559,324 B2 | 5/2003 | Strohmaier et al. |
| 6,602,537 B1 | 8/2003 | Cummings et al. |
| 6,787,150 B2 | 9/2004 | Benton |
| 6,890,548 B1 | 5/2005 | Morgan et al. |
| 6,924,382 B2 | 8/2005 | Strohmaier et al. |

OTHER PUBLICATIONS

Petit, H.V., et al, Performance of growing lambs fed grass silage with raw or extruded soybean or canola seeds. J. Anim. Sci, 77(1997) 455-463.*

Mustakas, G.C., et al., Crambe seed processing, improved feed meal by soda ash treatment. JAOCS 45 (1967) 53-57.*

The Effect of Dietary Fat Source on Performance article from Dairy Research & Technology Centre web site, (http://www.afns.ualberta.ca/Hosted/DRTG/Articles/Dietary_Fat.asp), dated Jan. 29, 2006.

Megalac Rumen Bypass Fat article from Arm & Hammer Animal Nutrition Group web site, (http://www.ahdairy.com/AHDairy/ourProducts/bypassFats/megalac.aspx), dated Jan. 29, 2006.

Canola Meal Feed Industry Guide, Nutrition Composition, article from Canola Meal—Nutrition Composition web site, (http://www.canola-council.org/meal4.html), dated Jan. 29, 2006.

* cited by examiner

PREPARING OIL SEED FOR RUMINANT FEED

This application claims priority of Provisional Application Ser. No. 60/764,185, filed Jan. 31, 2006, and entitled "Preparing Oil Seed For Ruminant Feed", the disclosure of which is hereby incorporated by reference.

BACKGROUND OF THE INVENTION

1. Field of the Invention

This invention relates generally to animal husbandry, and more specifically to preparing oil seeds, especially canola and flax seed, to render them suitable for use in ruminant feeds.

2. Related Art

Prior researchers have developed methods to modify canola seeds, for example, so that the triglycerides, fatty acids and protein present in the treated seeds, when fed to ruminant animals, bypass the rumen. Then, these nutritional components are digested in the abomasum and the small intestine of the animal. For example, Kennelly, et al., U.S. Pat. No. 5,662,958, discloses treating canola seeds with heat and aqueous alkaline solution to effect absorption of the alkaline solution onto the seed, but without impairing the integrity of the seed coat. In Kennelly's method, the canola seed coat remains substantially intact after treatment—it does not open, and is not removed from the seeds. Then, the treated seeds, with the seed coat substantially intact, are fed to ruminants. Kennelly in his disclosure repeatedly admonishes against treatments that excessively degrade the seed coat. Kennelly specifically states that the seeds should not be ground because grinding will alter or destroy the substantially intact seed coats.

Still, there is a need for preparing oil seeds for ruminant feed which does not entail feeding substantially whole seeds to the animal. A more digestible feed is desired. This invention addresses that need.

SUMMARY OF THE INVENTION

In one embodiment, the invention is a method for preparing oil seeds for ruminant feed. According to the method, oil seeds are subjected to heat and a preferably aqueous alkaline solution until the seed coat is substantially broken, exhibiting splits, cracks, wrinkles, and deformations, compared to naturally-occurring seeds, which have coats substantially intact. Preferably, the heat is applied until the mix of seeds and alkaline solution reaches between about 160-220° F. Preferably, the aqueous alkaline solution contains between about 30-130 pounds of soda ash ($Na_2CO_3$—sodium carbonate) per ton of seeds, and enough water to thoroughly wet, even slurry, the seeds. Preferably, the heat and alkaline solution treatment is maintained for between 20 and 100 minutes, in order to thoroughly "cook" the seeds, as exhibited by substantial swelling, splitting, wrinkling, cracking, and deforming of the seed coat. The heat and alkaline solution treatments may be done simultaneously, or separately in either order.

Then, according to this first embodiment, the hot, wet, treated seeds are subjected to, for example, a screw extruder, and formed into a damp noodle. As a result of the extruder, the seed coat is further broken, resulting in a damp, mealy noodle product with few, if any, whole seeds being present. Then, the noodle product is preferably subjected to hot air between about 200-300° F. for between about 10 and 60 minutes, until the noodle product temperature is about 225° F. Then, the noodle product is cooled with ambient air for a short time, and mechanically broken into generally cylindrical pellets between about ½-2 inches long for a final product.

In another embodiment, the invention is a method for preparing oil seeds by also subjecting the seeds which have been heat and aqueous alkaline solution treated to a grinding step to further break up the seed coat. The grinding may be done in any conventional manner, for example, in a roller mill, hammer mill or pin mill. Synergistically, the screw extruder, when it is fitted with an appropriate extrusion plate at the exit of the extruder, serves as an effective grinder. For example, for grinding hot, wet, alkaline solution treated seeds, an extrusion plate with holes between about 1/20 inch to about ¼ inch in diameter occupying between about 10%-90% of the surface area of the plate provides an effective grind of the seeds. The holes are preferably round, but they may be other shapes. The grinding may be done in one step, or in two or more sequential steps.

In another embodiment, the invention is a method for preparing oil seeds by also adding, to the seeds that have been heat and aqueous alkaline solution treated, an additional protein source to further encapsulate the oil seed protein and fat for safe passage through the rumen. For example, soybean meal in an amount equal to about ⅓ to 4 times the fat content of the oil seeds is an effective amount.

In another embodiment, the invention is a ruminant feed composition comprising a mix of between about 1-30% by weight of oil seeds treated according to the present inventive method and conventional ruminant feeds.

In still another embodiment, the invention is a method of feeding ruminants with oil seeds treated according to the present inventive method.

DETAILED DESCRIPTION OF THE PREFERRED EMBODIMENTS

Figure 1:
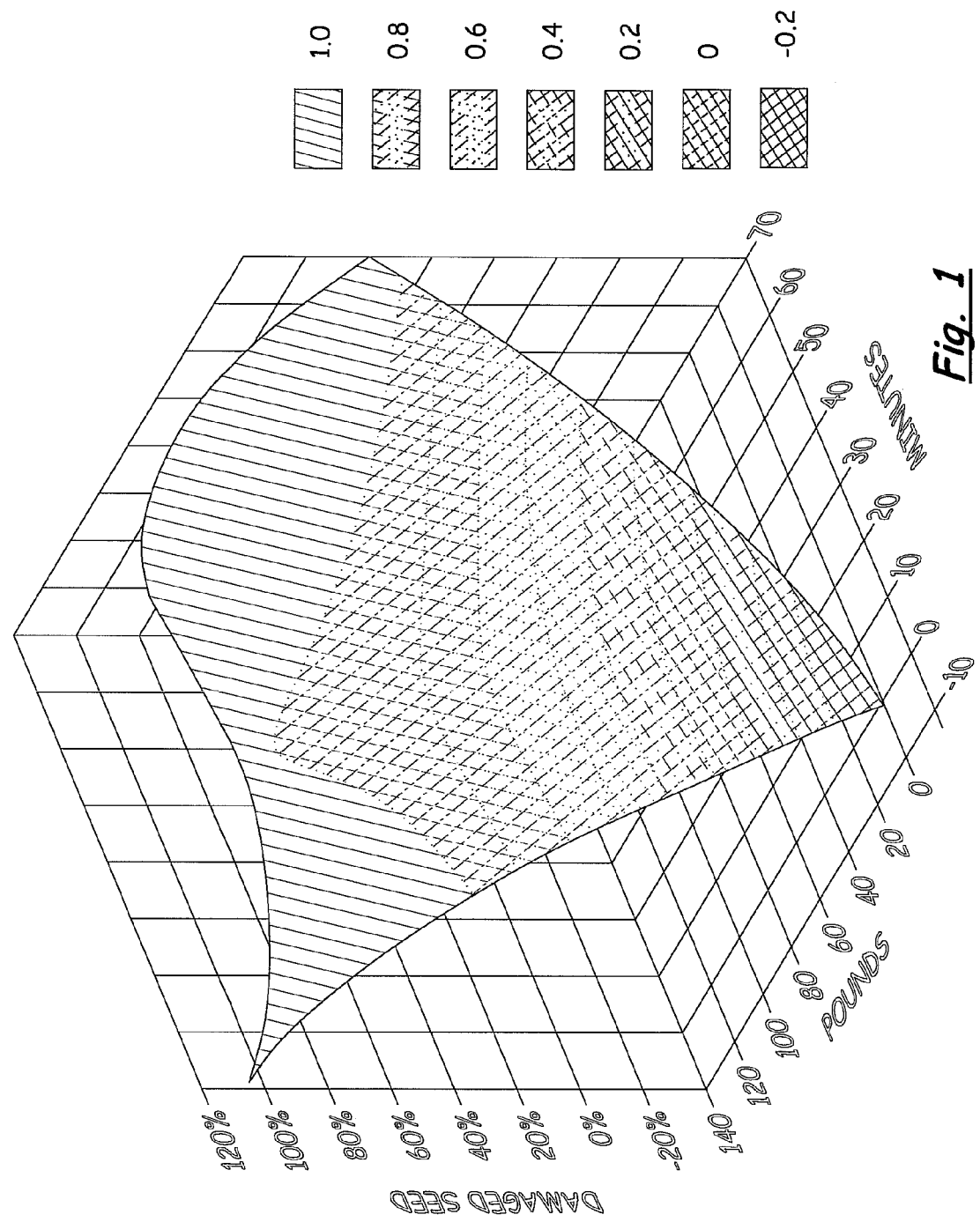
FIG. 1 is a surface plot showing the effect, in Example 1, of sodium carbonate (soda ash) and moist cooking time on percentage of damaged seeds (percent damaged seeds vs. pounds and time).

In one embodiment, the present invention is a method for preparing oil seeds for ruminant feed. The principal oil seeds of interest are canola, flax, soy, safflower or sunflower seeds, including mixtures thereof. However, use of other oil seeds, like, for example, rape seed, peanuts, and/or cotton seed may also be utilized, including mixtures thereof. Some oil seeds may need other pre- and/or post-treatment(s) to remove bad-taste or toxic components, or excessive lint or shell hull residue. The preferred oil seeds are canola and flax.

First, the oil seeds are subjected to heat and aqueous alkaline solution. The seeds may be heated first, and then subjected to the alkaline solution, or vice-versa. Or, the seeds and the alkaline solution may be mixed together and then subjected to the heat. In any event, the seeds, alkaline solution and heat are present together, preferably for between about 20 and 100 minutes. Preferably, water and soda ash are mixed and heated, and the solution is applied to the seed at steaming temperature or slightly boiling. The heat applied may be conductive, convective, or radiant. Preferably, the heat is applied until the treated mix is between about 160-220° F.

Preferably, the alkaline solution contains between about 30-130 pounds of soda ash ($Na_2CO_3$—sodium carbonate) per ton of seeds. However, other alkaline components, including mixtures thereof, may be used. For example, other preferred alkaline components include sodium sesqui-carbonate, and washed trona ore. After treatment, the seeds contain an elevated sodium level, compared to naturally-occurring seeds. Other contemplated alkaline components within the scope of the invention are, for example, sodium hydroxide (NaOH), potassium hydroxide (KOH), potassium carbonate ($K_2CO_3$), magnesium oxide (MgO), and magnesium hydroxide (MgOH), including mixtures thereof. When utilizing these other alkaline components, the preferred amount of them is generally stoichiometrically equivalent to the amount of sodium carbonate recited above. The amount and/or concentration of the alkaline solution preferably results in a finished noodle product of between about 9 and 11 pH. More preferably, the pH range for the finished noodle product is between about 9.5-10.5 pH.

The amount of water used to treat the seeds may vary. Generally, enough water is used to thoroughly wet, even slurry, the seeds. This feature aids in distributing the alkaline component over the seeds, and aids in the handling and processing of the treated seeds. On an industrial scale, the amount of water may be minimized in order to minimize the energy seeds for drying the finished product.

The heat and alkaline solution treatment is continued until the seeds are thoroughly "cooked." This means that a substantial portion of the treated seed coats are split, cracked, wrinkled or deformed. These are "good" seeds for the method of the present invention, in contrast to the teachings of the Kennelly patent, wherein these types of treated seeds were considered "bad" seeds to be avoided. In fact, after the present heat and alkaline solution treatment, a substantial amount of the seeds are "good"; at least 25%, preferably more than 50%, and even up to 90% and 95% by weight of the seed coats are split, cracked, wrinkled, or deformed, relative to the untreated seeds.

After the heat and alkaline solution treatment, preferably the treated seeds are farther processed in order to change their shape, and to improve their handling by workers and digestibility by ruminants. In one preferred embodiment, the treated seeds are subjected to a screw extruder and formed into a damp, thin noodle. However, other similar processing may also be done, for example, grinding, rolling, mashing, and/or macerating. It is thought by the inventor of the present invention that the heat and alkaline solution treatment at least partially "encapsulates" the oil/fat globules in the seed with a layer of denatured or "fixed" protein. This aids in increased pass-through capability in the rumen. Therefore, in the method of the present invention, aggressive treatment of the seed after the heat and alkaline solution treatment is not a bad thing—in fact, later aggressive treatment like extrusion, grinding, rolling or macerating, for example, of the treated seed may even aid digestibility of the "encapsulated" oil/fat in the abomasum and small intestine of the ruminant. Again, this is in stark contrast to the teachings of the Kennelly patent.

Further, even the relatively aggressive drying step of the present invention may further aid in both pass-through capability and abomasum and small intestine digestibility. For example, the application of drying heat to raise the temperature of the final product to 225° F. will further denature and "fix" protein capsules around the seed interior oil/fat globules, providing for more "pass-through" capability. Also, this last "heat-treat" in effect will further split, crack, wrinkle, and deform even seed coat fragments, making the interior matter of the seed more available for digestive juices in the abomasum and small intestine.

Following are Worked Examples illustrating some, but not all, embodiments of the invented methods and products.

EXAMPLE 1

See FIG. 1

To determine the effect of sodium carbonate (soda ash) and moist cooking time on the seed coat of canola, a study was set up to test the interaction of moist cooking time at 190° F. and soda ash at varying levels. The response surface included untreated whole canola as a control and eight treated cells. The treated cells ranged across three time points (20, 40 and 60 minutes) and soda ash ranged across five levels (0, 30, 60, 90 and 120 pounds per ton of seed). Visual observations of the seed coats were made by four individuals. The observations were made by counting the number of intact, split coat, wrinkled and deformed seeds in a sub sample following drying. Seeds which had split coats, or were wrinkled or deformed were considered damaged. An equation and response surface graph was generated from the observations using StatSoft, Inc. (2003). STATISTICA (data analysis software system), version 6. www.statsoft.com. The data indicated a treatment dose of 80 pounds soda ash and 40 minutes cooking time produced acceptable swelling and cracking of the seed coat. See FIG. 1: 3D Surface Plot (New STATISTICA Spreadsheet 10v*9c) Damaged Seed=0.1016+0.0029*x+0.0126*y+0.0001*x*x−0.0001*x*y−4.7878E−5*y*y

EXAMPLE 2

Figure 2:
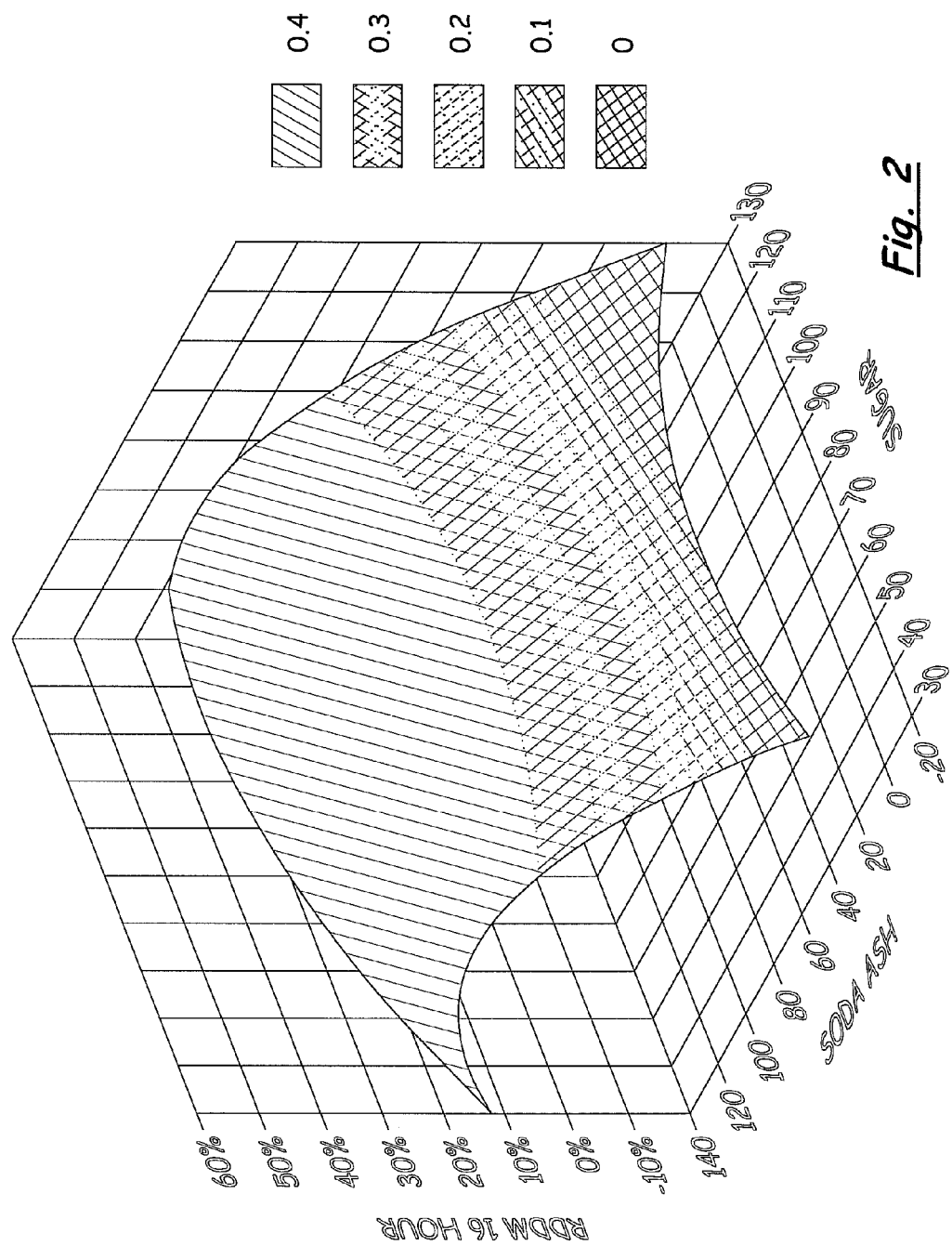
FIG. 2 is a plot showing the effect, in Example 2, of levels of sodium and sucrose on rumen digestible dry matter at 16 hours in moist cooking (RDDM 16 hours vs. soda ash and sugar).
Figure 3:
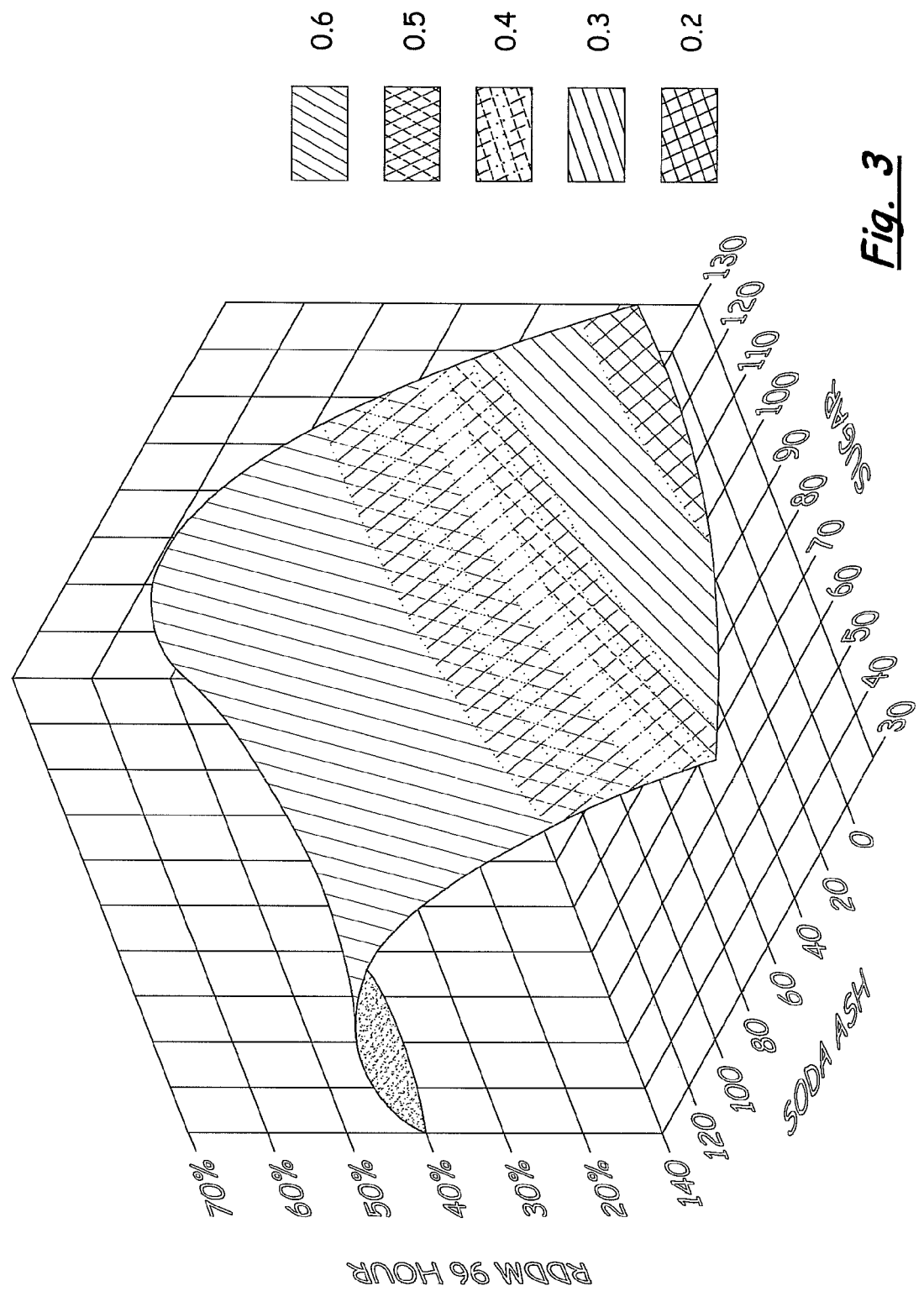
FIG. 3 is a plot showing the effect, in Example 2, of levels of sodium and sucrose on rumen digestible dry matter at 96 hours in moist cooking (RDDM 96 hours vs. soda ash and sugar).
Figure 4:
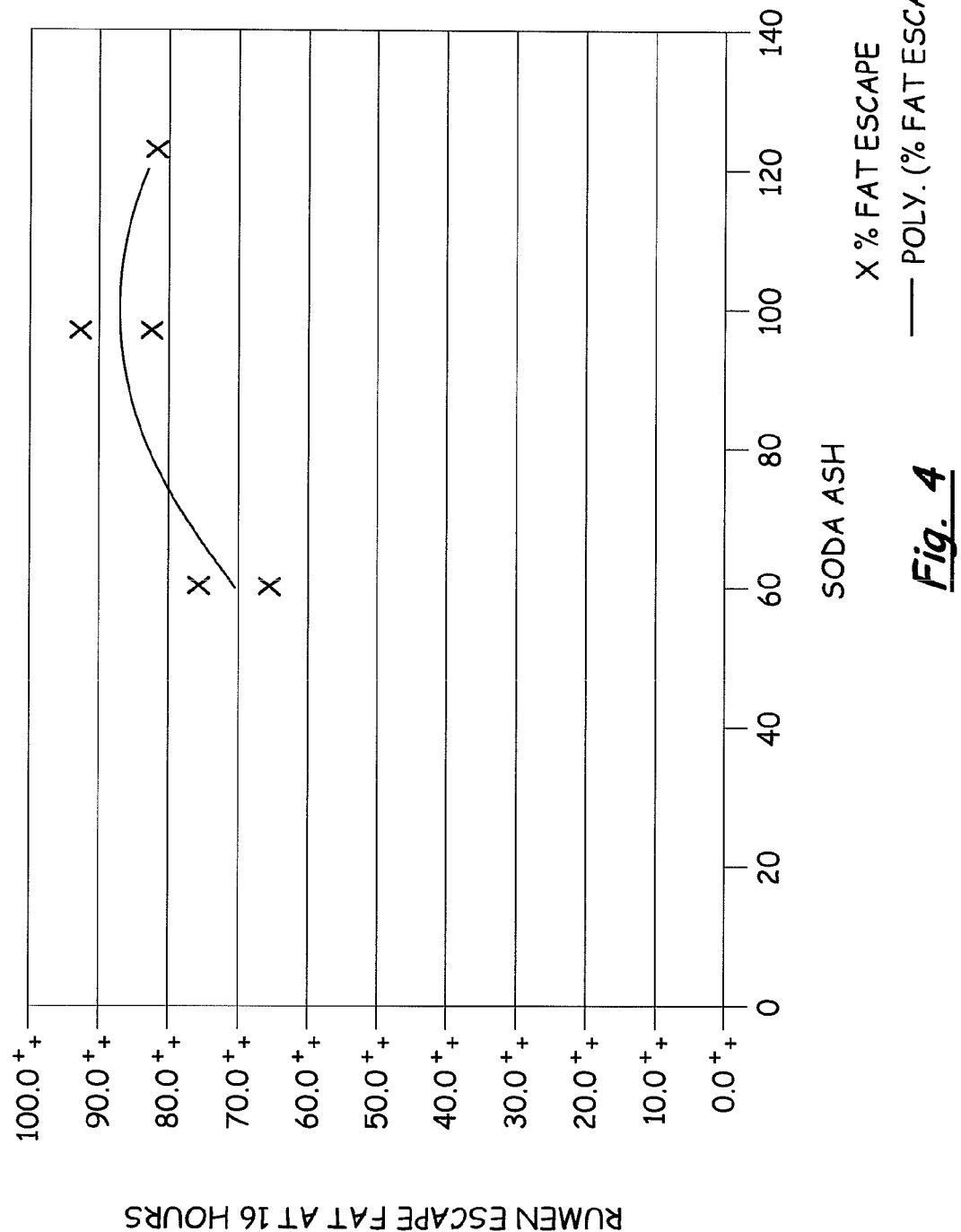
FIG. 4 is a plot of rumen escape fat at 16 hours vs. soda ash, in Example 2.

See FIGS. 2, 3, and 4

To determine the rumen digestible dry matter at 16 and 96 hours and protein and fat escape rates at 16 hours of whole canola seed subjected to moist cooking and treatment with varying levels of sodium carbonate (soda ash) and sucrose the following response surface study was conducted. The treatment levels to be tested were based on the results found in Example 1: The samples were prepared by mixing the soda ash and sucrose in steaming water. The solution was thoroughly mixed with the whole seed and allowed to moist cook at 190-200° F. with gentle mixing every 10-15 minutes in a 20 quart capacity Rival Programmable Oven Roaster. After cooking for 60 minutes the material was processed through a meat grinder with a #12 plate with ⅛" die. The noodles from the grinder were placed on a screen and heated forced air (240-250° F.) was passed through the noodles for 20-30 minutes to dry. The product temperatures at end of drying were 225° F. Unheated air was passed through the noodles for 5 minutes to cool to room temperature. The samples were stored in plastic containers.

The ground subsamples were analyzed by standard wet chemistry methods for dry matter, crude protein, ash, sodium and pH. Crude fat was determined by double extraction using pet ether on double ground subsamples. Eight subsamples of each batch were weighed into standard rumen digestion bags. Two bag were used to determine bag wash out and three bags were placed in a standard digestion tube (Bar Diamond, Inc., Parma, Id.) and three bags were place in a second digestion tube. One tube was place in the rumen of a fistulated steer of sixteen hours and the second tube was in the animal for ninety-six hours. When the digestion tubes were removed from the animal, the bags were washed until the rinse was clear. The bags were dried and weighted.

The bags were extracted with pet ether for five hours into a beaker on a LabConco 6 bank fat extractor. Then the bag was dried to remove residual ether and the bag was opened and the contents recovered and fine ground. A sample of the ground material was weighed into a filter paper and placed on the fat extractor for a second 5 hour extraction into a second beaker. The residual content in the filter paper was dried to remove residual ether and sample was weighed for standard wet chemistry crude protein analysis.

The test treatments and least squared means results determined using the GLM method in StatSoft, Inc. (2003). STATISTICA (data analysis software system), version 6. www.statsoft.com. Sugar and soda ash levels are pounds per 2000 pounds of whole canola seed.

TABLE 1

| Cell | Sugar | Soda Ash | RDDM 16 | RDDM 96 | % Protein Escape | % Fat Escape | pH |
|---|---|---|---|---|---|---|---|
| 1 | 80 | 0 | 17.1% | 30.6% | 85.3% | 99.4% | 5.72 |
| 2 | 40 | 30 | 34.6% | 58.0% | 60.0% | 87.4% | 7.39 |
| 3 | 120 | 30 | 33.3% | 51.0% | 66.4% | 92.5% | 8.20 |
| 4 | 80 | 60 | 43.6% | 51.7% | 53.7% | 67.6% | 9.85 |
| 5 | 80 | 60 | 45.5% | 57.5% | 51.6% | 73.5% | 9.87 |
| 6 | 40 | 90 | 31.7% | 53.2% | 63.9% | 91.2% | 9.83 |
| 7 | 120 | 90 | 39.8% | 54.3% | 52.5% | 81.3% | 10.08 |
| 8 | 80 | 120 | 43.6% | 52.2% | 51.3% | 81.2% | 10.39 |

See FIG. 2: Rumen Digestible Dry Matter at 16 hours, Weak Response to Sucrose and Strong Sodium Carbonate Response. 3D Surface Plot (Bypass Fat Summary Data #6 15v*27c). RDDM 16 hr=$0.0233+0.0054*x-+0.0048*y-3.8398E-5*x*x+1.9583E-5*x*y-3.9569E-5*y*y$ See FIG. 3: Rumen Digestible Dry Matter at 96 hours, Rumen Digestible Dry Matter at 96 hours, Weak Response to Sucrose and Strong Sodium Carbonate Response. 3D Surface Plot (Bypass Fat Summary Data #6 15v*27c). RDDM 96 hr=$0.5685-0.0042*x-+0.0042*y-1.7734E-5*x*x+1.6875E-5*x*y-3.662E-5*y*y$ See Tables 2, 3, and 4: LS means for Soda Ash effect on 16 hour Rumen Digestible Dry Matter (RDDM 16 hr). Sugar effect was removed as a covariant. All the cells which received Soda Ash had improved RDDM 16 hr.

TABLE 2

| Variable | Means for covariates (Bypass Fat Summary Data #6) LS means are computed for these values Mean |
|---|---|
| Sugar | 80.00000 |

TABLE 3

Soda Ash; LS Means (Bypass Fat Summary Data #6)
Current effect: $F(4, 18) = 54.840, p = .00000$
(Computed for covariates at their means)

| Cell No. | Soda Ash | RDDM 16 hr Mean | RDDM 16 hr Std. Err. | RDDM 16 hr −95.00% | RDDM 16 hr +95.00% | N |
|---|---|---|---|---|---|---|
| 1 | 0 | 0.170967 | 0.016116 | 0.137108 | 0.204826 | 3 |
| 2 | 30 | 0.339683 | 0.011396 | 0.315741 | 0.363625 | 6 |
| 3 | 60 | 0.445750 | 0.011396 | 0.421808 | 0.469692 | 6 |
| 4 | 90 | 0.357717 | 0.011396 | 0.333775 | 0.381659 | 6 |

TABLE 3-continued

Soda Ash; LS Means (Bypass Fat Summary Data #6)
Current effect: $F(4, 18) = 54.840, p = .00000$
(Computed for covariates at their means)

| Cell No. | Soda Ash | RDDM 16 hr Mean | RDDM 16 hr Std. Err. | RDDM 16 hr −95.00% | RDDM 16 hr +95.00% | N |
|---|---|---|---|---|---|---|
| 5 | 120 | 0.435633 | 0.016116 | 0.401774 | 0.469492 | 3 |

TABLE 4

Dunnett test; variable RDDM 16 hr (Bypass Fat Summary Data #6)
Probabilities for Post Hoc Tests (2-sided)
Error: Between MS = .00078, df = 18.000

| Cell No. | Soda Ash | {1} .17097 |
|---|---|---|
| 1 | 0 | |
| 2 | 30 | 0.000035 |
| 3 | 60 | 0.000035 |
| 4 | 90 | 0.000035 |
| 5 | 120 | 0.000035 |

See Tables 5 and 6: LS means for Sugar effect on 16 hour Rumen Digestible Dry Matter (RDDM 16 hr). Soda Ash effect was removed as a covariant. Sugar did not have an effect on RDDM 16 hr.

TABLE 5

| Variable | Means for covariates (Bypass Fat Summary Data #6) LS means are computed for these values Mean |
|---|---|
| Soda Ash | 60.00000 |

TABLE 6

Sugar; LS Means (Bypass Fat Summary Data #6)
Current effect: $F(2, 20) = .73867, p = .49034$
(Computed for covariates at their means)

| Cell No. | Sugar | RDDM 16 hr Mean | RDDM 16 hr Std.Err. | RDDM 16 hr −95.00% |
|---|---|---|---|---|
| 1 | 40 | 0.331717 | 0.029016 | 0.271191 |
| 2 | 80 | 0.374525 | 0.020517 | 0.331727 |
| 3 | 120 | 0.365683 | 0.029016 | 0.305157 |

Rumen digestible dry matter (RDDM 16) at 16 hours averaged 34.9% for all soda ash treatments v 17.1% for untreated canola, 2.27 fold increase. At 96 hours the average rumen digestible dry matter (RDDM 96) was 54.0% for all soda ash treatments v 30.6% for untreated canola, 1.76 fold increase.

Based on the observation that sugar has a weak response on improving the amount of the canola digested in the rumen at 16 and 96 hours, analysis of protein and fat escape was done by soda ash level only. In inspecting the data at 30 pounds soda ash per 2000 pounds canola it was not clear how much of the protein and fat escape from the rumen was due to the action of soda ash level or due to the lack of digestion as occurs with the untreated seed. The analysis of protein and fat escape only include cell with more than 30 pounds soda ash per 2000 pounds. See Table 7: Crude Protein Escape at 16 Hours: No significant differences were observed between protein escape rates at 60, 90, 120 lbs soda ash per 2000 lbs canola. See Tables 8 and 9: Crude Fat Escape at 16 Hours: Fat escape at the 90 lb soda ash level was significantly better than the 60 lb soda ash level and not different from the 120 lb level of soda ash.

TABLE 7

Soda Ash; LS Means (Bypass Fat Summary Data #6)
Current effect: $F(2, 12) = 2.0800$, $p = .16766$
Effective hypothesis decomposition

| Cell No. | Soda Ash | CP Escape Rate Mean | CP Escape Rate Std. Err. | CP Escape Rate −95.00% | CP Escape Rate +95.00% | N |
|---|---|---|---|---|---|---|
| 1 | 60 | 0.526450 | 0.023087 | 0.476148 | 0.576752 | 6 |
| 2 | 90 | 0.581833 | 0.023087 | 0.531531 | 0.632135 | 6 |
| 3 | 120 | 0.512800 | 0.032650 | 0.441662 | 0.583938 | 3 |

TABLE 8

Soda Ash; LS Means (Bypass Fat Summary Data #6)
Current effect: $F(2, 12) = 10.286$, $p = .00250$
Effective hypothesis decomposition

| Cell No. | Soda Ash | Fat Escape Rate Mean | Fat Escape Rate Std. Err. | Fat Escape Rate −95.00% | Fat Escape Rate +95.00% | N |
|---|---|---|---|---|---|---|
| 1 | 60 | 0.705150 | 0.024846 | 0.651015 | 0.759285 | 6 |
| 2 | 90 | 0.862550 | 0.024846 | 0.808415 | 0.916685 | 6 |
| 3 | 120 | 0.811800 | 0.035137 | 0.735242 | 0.888358 | 3 |

TABLE 9

Unequal N HSD; variable
Fat Escape Rate (Bypass Fat
Approximate Probabilities for Post Hoc Tests
Error: Between MS = .00370, df = 12.000

| Cell No. | Soda Ash | {1} .70515 | {2} .86255 | {3} .81180 |
|---|---|---|---|---|
| 1 | 60 | | 0.002158 | 0.122041 |
| 2 | 90 | 0.002158 | | 0.578219 |
| 3 | 120 | 0.122041 | 0.578219 | |

See FIG. 4: Rumen Escape Fat at 16 hours (equation: $y = -0.0001x^2 + 0.0226x - 0.2341$, $R^2 = 0.7943$) Based on this data the optimum rumen escape fat occurs between 75 to nearly 100 lbs of soda ash per ton. This agrees quite well with the predicted optimum dose from Example 1. From this data rumen escape of fat at 16 hours is 75 to 85% at optimum soda ash levels.

EXAMPLE 3

A single cell of flax seed treated at the levels and manner of cells 4 and 5 in Example 2 was included in the rumen digestion test used in Example 3. The data from cells 4 and 5 (canola) was compared to this flax cell. The data was tested using StatSoft, Inc. (2003). STATISTICA (data analysis software system), version 6. www.statsoft.com. See Table 10: Comparison of Cannola and Flax Seeds processed using 60 lbs soda ash per 2000 lbs. Flax had a significantly lower rumen digestible dry matter at 16 hours than canola seed at the same treatment level.

TABLE 10

Seed Type; LS Means (Bypass Fat Summary Data #6)
Current effect: $F(1, 7) = 65.424$, $p = .00008$
Effective hypothesis decomposition

| Cell No. | Seed Type | RDDM 16 hr Mean | RDDM 16 hr Std. Err. | RDDM 16 hr −95.00% | RDDM 16 hr +95.00% | N |
|---|---|---|---|---|---|---|
| 1 | Canola | 0.445750 | 0.009211 | 0.423968 | 0.467532 | 6 |
| 2 | Flax | 0.316700 | 0.013027 | 0.285896 | 0.347504 | 3 |

See Table 11: Flax had a significantly higher protein escape at 16 hours than canola.

TABLE 11

Seed Type; LS Means (Bypass Fat Summary Data #6)
Current effect: $F(1, 7) = 125.72$, $p = .00001$
Effective hypothesis decomposition

| Cell No. | Seed Type | CP Escape Rate Mean | CP Escape Rate Std. Err. | CP Escape Rate −95.00% | CP Escape Rate +95.00% | N |
|---|---|---|---|---|---|---|
| 1 | Canola | 0.526450 | 0.008391 | 0.506609 | 0.546291 | 6 |
| 2 | Flax | 0.689400 | 0.011866 | 0.661341 | 0.717459 | 3 |

See Table 12: Flax had a significantly higher fat escape at 16 hours than canola.

TABLE 12

Seed Type; LS Means (Bypass Fat Summary Data #6)
Current effect: $F(1, 7) = 23.910$, $p = .00177$
Effective hypothesis decomposition

| Cell No. | Seed Type | Fat Escape Rate Mean | Fat Escape Rate Std. Err. | Fat Escape Rate −95.00% | Fat Escape Rate +95.00% | N |
|---|---|---|---|---|---|---|
| 1 | Canola | 0.705150 | 0.022475 | 0.652004 | 0.758296 | 6 |
| 2 | Flax | 0.895500 | 0.031785 | 0.820341 | 0.970659 | 3 |

Based on this data it appears flax responds to soda ash treatment similar to canola.

EXAMPLE 4

Effect of Extrusion Methods and Added Protein on 16 Hour Rumen Escape of Soda Ash Treated Canola Seed Protein and Fat Previous studies with processing canola seed have confirmed the amount of soda ash, temperature, water and steep time required to optimize the escape of lipid (fat) and protein from the rumen at 16 hours. These studies have indicated that fat escape is directly related to protein escape. In one study it was found if the fat is free and the protein is not properly mixed with the fat in a manner allowing the protein to "wrap" around the fat, the improvement in protein escape did not result in the improvement in fat escape.

In previous work we have determined that extrusion through a grinding plate will "break" open the seed coat previously expanded and softened by steeping with hot water and soda ash. By breaking or splitting the seed coat it is general knowledge that the overall digestion of both fat and protein are improved.

What is needed is method of processing canola seed to produce uniform improvement in rumen escape of fat and protein while insuring the seed coat does not reduce the overall digestion of fat and protein.

This study was conducted to evaluate canola seed processing on fat and protein escape using previously determined optimum steep time, temperature and soda ash added at the proper relationship to the protein. The treatments were added protein from soybean meal, single versus double grinding, and small plate (5/64 inch) versus large plate (1/8). The interactions and main effects were tested using the GLM module of StatSoft, Inc. (2002). STATISTICA (data analysis software system), version 6. www.statsoft.com.

The following treatments were formulated where the targeted fat to protein ratios varied from 2 to 1, 1.5 to 1, 1.25 to 1 and to 1. The protein ratio was varied by the addition of soybean meal. Soda ash additions were equal to the targeted amount of the protein. The canola seed only treatments received 75 lb of soda ash per 2000 lb. The soda ash level was increased with the additions of soybean meal to maintain a uniform protein to soda ash ratio.

Treatments

Ganola with soda ash only (2.00:1) 5/64 die plate, Single grind
Ganola with soda ash only (2.00:1) 5/64 die plate, Double grind
Ganola with soda ash only (2.00:1) 1/8 die plate. Single grind
Canola with soda ash only (2.00:1) 1/8 die plate. Double grind
Canola with added soybean meal (1.50:1) 5/64 die plate, Single grind
Canola with added soybean meal (1-50:1) 5/64 die plate, Double grind
Canola with added soybean meal (1.50:1) 1/8 die plate, Single grind
Canola with added soybean meal (1.50:1) 1/8 die plate, Double grind
Canola with added soybean meal (1.25:1) 5/64 die plate, Single grind
Canola with added soybean meal (125:1) 5/64 die plale, Double grind
Canola with added soybean meal (1.25:1) 1/8 die plate, Single grind
Canola with added soybean meal (125:1) 1/8 die plate, Double grind
Canola with added soybean meal (1.00:1) 5/64 die plate, Single grind
Canola with added soybean meal (1.00:1) 5/64 die plate, Double grind
Canola with added soybean meal (1.00:1) 1/8 die plate, Single grind
Canola with added soybean meal (1.00:1) 1/8 die plate, Double grind See Tables 13-16: Analysis of Rumen Fat Escape at 16 hours as modified by single versus double grind and small (5/64 inch) plate versus large (1/8 inch) plate with digestion tube and fat to protein ratio equalized as covariates.

TABLE 13

Univariate Tests of Significance for Fat Escape (Study 14 Data) Sigma-restricted parameterization Effective hypothesis decomposition

| Effect | SS | Degr. of Freedom | MS | F | p |
|---|---|---|---|---|---|
| Intercept | 2.861788 | 1 | 2.861788 | 117.5577 | 0.000000 |
| Tube | 0.051450 | 1 | 0.051450 | 2.1135 | 0.151398 |
| Actual Fat/Prot | 0.034803 | 1 | 0.034803 | 1.4296 | 0.236689 |
| Plate | 0.098533 | 1 | 0.098533 | 4.0476 | 0.048888 |
| Grind | 0.083203 | 1 | 0.083203 | 3.4179 | 0.069594 |
| Plate * Grind | 0.001294 | 1 | 0.001294 | 0.0532 | 0.818458 |

TABLE 13-continued

Univariate Tests of Significance for Fat Escape (Study 14 Data) Sigma-restricted parameterization Effective hypothesis decomposition

| Effect | SS | Degr. of Freedom | MS | F | p |
|---|---|---|---|---|---|
| Error | 1.411934 | 58 | 0.024344 | | |

TABLE 14

Means for covariates (Study 14 Data) LS means are computed for these values

| Variable | Mean |
|---|---|
| Tube | 1.500000 |
| Actual Fat/Prot | 1.410929 |

TABLE 15

Grind; LS Means (Study 14 Data) Current effect: F(1, 58) = 3.4179, p = .06959 (Computed for covariates at their means)

| Cell No. | Grind | Fat Escape Mean | Fat Escape Std. Err. | Fat Escape −95.00% | Fat Escape +95.00% | N |
|---|---|---|---|---|---|---|
| 1 | Single | 0.844628 | 0.027582 | 0.789418 | 0.899838 | 32 |
| 2 | Double | 0.916741 | 0.027582 | 0.861530 | 0.971951 | 32 |

TABLE 16

Plate; LS Means (Study 14 Data) Current effect: F(1, 58) = 4.0476, p = .04889 (Computed for covariates at their means)

| Cell No. | Plate | Fat Escape Mean | Fat Escape Std. Err. | Fat Escape −95.00% | Fat Escape +95.00% | N |
|---|---|---|---|---|---|---|
| 1 | Small | 0.919922 | 0.027582 | 0.864711 | 0.975132 | 32 |
| 2 | Large | 0.841447 | 0.027582 | 0.786236 | 0.896657 | 32 |

Double grinding improved fat escape over single grinding. The difference approached significance (p=0.06959). Using a small plate (5/64 inch) improved fat escape over using a large plate (1/8 inch). The difference is significant (p=0.04889). The number of grindings and plate size effect are independent; no interaction between number of grindings and plate size exists.

See Tables 17-19: Analysis of Rumen Protein Escape at 16 hours as modified by single versus double grind and small (5/64 inch) plate versus large (1/8 inch) plate with digestion tube and fat to protein ratio equalized as covariates.

TABLE 17

Univariate Tests of Significance for Protein Escape (Study 14 Data) Sigma-restricted parameterization Effective hypothesis decomposition

| Effect | SS | Degr. of Freedom | MS | F | P |
|---|---|---|---|---|---|
| Intercept | 2.090155 | 1 | 2.090155 | 109.3026 | 0.000000 |
| Tube | 0.021514 | 1 | 0.021514 | 1.1250 | 0.293235 |
| Actual Fat/Prot | 0.108702 | 1 | 0.108702 | 5.6845 | 0.020407 |
| Plate | 0.000053 | 1 | 0.000053 | 0.0027 | 0.958368 |
| Grind | 0.088402 | 1 | 0.088402 | 4.6229 | 0.035729 |

TABLE 17-continued

Univariate Tests of Significance for
Protein Escape (Study 14 Data)
Sigma-restricted parameterization
Effective hypothesis decomposition

| Effect | SS | Degr. of Freedom | MS | F | P |
|---|---|---|---|---|---|
| Plate * Grind | 0.004573 | 1 | 0.004573 | 0.2391 | 0.626667 |
| Error | 1.109114 | 58 | 0.019123 | | |

TABLE 18

| Variable | Means for covariates (Study 14 Data) LS means are computed for these values Mean |
|---|---|
| Tube | 1.500000 |
| Actual Fat/Prot | 1.410929 |

TABLE 19

Grind; LS Means (Study 14 Data)
Current effect: $F(1, 58) = 4.6229, p = .03573$
(Computed for covariates at their means)

| Cell No. | Grind | Protein Escape Mean | Protein Escape Std.Err. | Protein Escape −95.00% | Protein Escape +95.00% | N |
|---|---|---|---|---|---|---|
| 1 | Single | 0.650928 | 0.024446 | 0.601995 | 0.699861 | 32 |
| 2 | Double | 0.725259 | 0.024446 | 0.676326 | 0.774192 | 32 |

Double grinding is significantly (p=0.03573) better in increasing 16 hour protein escape than single grinding. Plate size did not affect protein escape. Fat to protein ratio has a significant effect on protein escape.

Relationship of protein escape to fat to protein ratio with grind affect equalized.

EXAMPLE 4

Results

Double grinding improved fat escape over single grinding by 8.5%. The difference approached significance. Using a small plate (5/64 inch) improved fat escape over using a large plate (1/8 inch) by 9.3%. The difference is significant. The number of grindings and plate size effect are independent; no interaction between number of grindings and plate size exists. The combined improvement in fat escape by using small plate and double grinding may be as much as 17.8% over using large plate and single grinding.

Double grinding is significantly better in increasing 16 hour protein escape than single grinding. Plate size did not affect protein escape. Fat to protein ratio has a significant effect on protein escape. Double grinding may improve protein escape by 11.4%

Although this invention has been described above and in Appendix I with reference to particular means, materials and embodiments, it is to be understood that the invention is not limited to these disclosed particulars, but extends instead to all equivalents within the broad scope of the following claims.

The invention claimed is:

1. A method of preparing canola or flax seeds for ruminant feed, the method comprising:
    subjecting the canola or flax seeds, with seed coats intact, to heat and an alkaline solution until the mix of seeds and alkaline solution reaches between about 160-220° F., so that the seed coats are broken, exhibiting splits, cracks, wrinkles or deformations, and then grinding the heat and alkaline solution treated seeds to further break the seed coats.

2. The method of claim 1 wherein the alkaline solution is aqueous.

3. The method of claim 2 wherein the aqueous alkaline solution contains between about 30-130 pounds of sodium carbonate per ton of seeds.

4. The method of claim 3 wherein the heat and aqueous alkaline solution treatments are maintained for a total time of between about 20 and 100 minutes.

5. The method of claim 1 wherein the grinding is done in a screw extruder with an orifice extrusion plate at the exit of the extruder.

6. The method of claim 5 wherein the grinding is done more than once.

7. The method of claim 1 which also comprises adding an additional protein source to the heat and alkaline solution treated seeds.

8. The method of claim 7 wherein the additional protein source is soy bean meal.

* * * * *